US012283253B2

(12) United States Patent
Sugiyama

(10) Patent No.: US 12,283,253 B2
(45) Date of Patent: Apr. 22, 2025

(54) VOLTAGE MONITORING DEVICE, LIGHTING DEVICE, AND DISPLAY DEVICE

(71) Applicant: Sharp Kabushiki Kaisha, Sakai (JP)

(72) Inventor: Hiroaki Sugiyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 435 days.

(21) Appl. No.: 17/861,337

(22) Filed: Jul. 11, 2022

(65) Prior Publication Data

US 2023/0041166 A1 Feb. 9, 2023

(30) Foreign Application Priority Data

Aug. 4, 2021 (JP) ................................ 2021-128275

(51) Int. Cl.

*G09G 3/34* (2006.01)
*G09G 3/32* (2016.01)
*G09G 3/36* (2006.01)

(52) U.S. Cl.

CPC ............. *G09G 3/3406* (2013.01); *G09G 3/32* (2013.01); *G09G 3/3648* (2013.01); *G09G 2320/0646* (2013.01); *G09G 2330/021* (2013.01); *G09G 2354/00* (2013.01)

(58) Field of Classification Search

CPC ...... G09G 3/3406; G09G 3/32; G09G 3/3648; G09G 2320/0646; G09G 2330/021; G09G 2354/00

See application file for complete search history.

(56) References Cited

U.S. PATENT DOCUMENTS

2014/0240966 A1* 8/2014 Garcia ................... H05B 45/10 362/183
2022/0406259 A1* 12/2022 Lee ...................... G09G 3/3266

FOREIGN PATENT DOCUMENTS

JP 2009117121 A * 5/2009 ............. Y02B 20/40

* cited by examiner

*Primary Examiner* — Chad G Erdman
(74) *Attorney, Agent, or Firm* — Keating & Bennett, LLP

(57) ABSTRACT

A voltage monitoring device includes a voltage supply device configured to supply a second voltage generated from a first voltage to the electric component, a voltage supply control section configured to control the voltage supply device, a voltage level detection section configured to detect a voltage level related to the first voltage, and a voltage monitor section configured to monitor the first voltage, compare the voltage level with a first threshold in the voltage non-supply time, compare the voltage level with a second threshold that is lower than the first threshold in the voltage supply time, control the voltage supply device to continue supplying the second voltage when the voltage level is higher than the first threshold or the second threshold, and control the voltage supply device to stop supplying the second voltage when the voltage level is lower than the first threshold or the second threshold.

8 Claims, 9 Drawing Sheets

VOLTAGE MONITORING DEVICE, LIGHTING DEVICE, AND DISPLAY DEVICE

CROSS-REFERENCE TO RELATED APPLICATION

This application claims priority from Japanese patent application No. 2021-128275 filed on Aug. 4, 2021. The entire contents of the priority application are incorporated herein by reference.

TECHNICAL FIELD

The technology described herein relates to a voltage monitoring device, a lighting device, and a display device.

BACKGROUND

A LED drive circuit includes a duty ratio setting part that sets a duty ratio according to a voltage based on a digital conversion value. A time measurement part measures a voltage fluctuation time between the highest voltage and the lowest voltage based on the digital conversion value. A period setting part changes the PWM period. when the set PWM period matches the voltage fluctuation time. A driving signal generation part generates a driving signal having the duty ratio and the PWM period.

With such a LED drive circuit, luminance of light rays emitted by the LEDs can be kept constant irrespective of the power supply voltage fluctuation time when driving the LEDs with the PWM control. In a liquid crystal display device that includes the LEDs as a light source of a backlight, the voltage may drop according to a current supplied to the LED. With the LEDs being driven with a low voltage, the liquid crystal display may be stopped unintentionally due to the voltage drop, which may be quite small, and this adversely affects devices. To prevent the above problems, the liquid crystal display device maybe stopped safely when the power supply voltage becomes lower than a predefined threshold. However, when the voltage drops according to the current supplied to the LEDs and the power supply voltage becomes lower than the predefined threshold, the backlight is temporally turned off and the power supply voltage recovers its original value. Accordingly, the power supply voltage becomes greater than the threshold and the backlight is turned on again and the power supply voltage drops again. This turns off the backlight again. This procedure is repeatedly performed and the backlight is turned on and off repeatedly in a periodical manner.

SUMMARY

According to the technology disclosed in herein, a voltage is monitored properly.

A voltage monitoring device according to the technology described herein includes a voltage supply device configured to receive a first voltage from an external device and generate a second voltage for driving an electric component from the first voltage and supply the second voltage to the electric component, a voltage supply control section configured to control the voltage supply device and control a duty ratio of a voltage supply time in which the second voltage is supplied to the electric component from the voltage supply device and a voltage non-supply time in which the second voltage is not supplied to the electric component from the voltage supply device, a voltage level detection section configured to detect a voltage level related to the first voltage, and a voltage monitor section. The voltage monitor section is configured to compare the voltage level with a first threshold in the voltage non-supply time, compare the voltage level with a second threshold in the voltage supply time, the second threshold being lower than the first threshold, control the voltage supply device to continue supplying the second voltage when the voltage level is higher than the first threshold or the second threshold, and control the voltage supply device to stop supplying the second voltage when the voltage level is lower than the first threshold or the second threshold.

According to the technology described herein, a voltage can be monitored properly.

DETAILED DESCRIPTION

First Embodiment

A first embodiment will be described with reference to FIGS. 1 to 5, and 8. A voltage monitoring device 30 included in a liquid crystal display device 10 (a display device) will be described.

Figure 1:
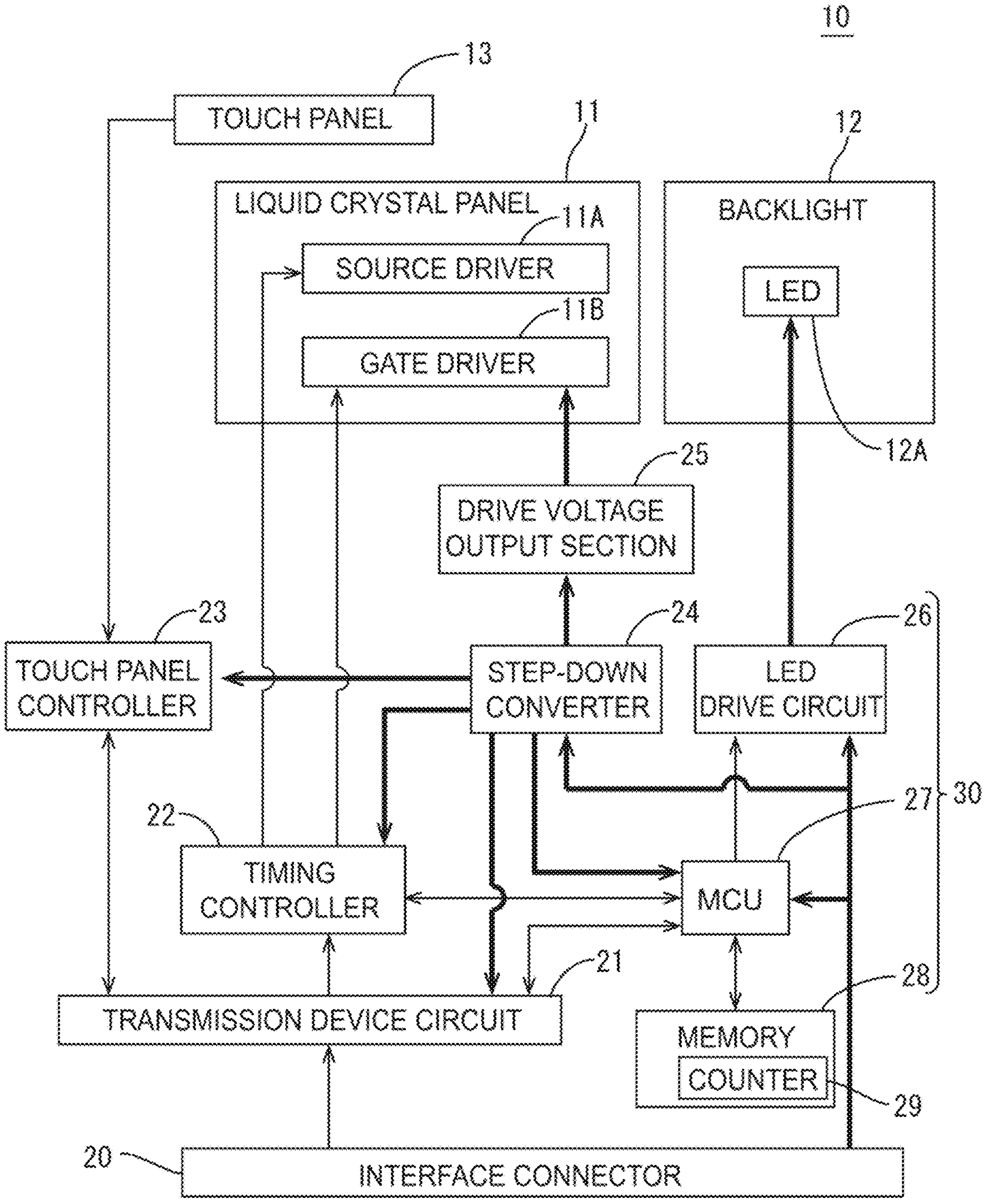
FIG. 1 is a block diagram illustrating an electrical configuration of a liquid crystal display device including a monitoring device according to a first embodiment and a second embodiment.

The liquid crystal display device 10 is installed in a vehicle, for instance, and is operated with using a power supply voltage supplied from a battery that is installed in the vehicle. As illustrated in FIG. 1, the liquid crystal display device 10 includes a liquid crystal panel 11 displaying an image, a backlight 12 (a lighting device) supplying the liquid crystal panel 11 with light for display, and a touch panel 13 detecting an input position on the liquid crystal panel 11 inputted by a user. The liquid crystal panel 11 includes a source driver 11A outputting image signals (source signals) related to display images and a gate driver 11B outputting scan signals (gate signals). The backlight 12 includes LED elements 12A (a light source) that emit light according to the supply of a voltage.

Next, a circuit configuration for supplying various kinds of signals and drive voltages to the liquid crystal panel 11, the backlight 12, and the touch panel 13 will be described. The liquid crystal display device 10 includes an interface connector 20, a transmission device circuit 21, a timing controller 22, a touch panel controller 23, a step-down converter 24, a drive voltage output section 25 (a drive voltage output circuit), an LED drive circuit 26 (a voltage supply device), a micro control unit (MCU) 27 (a voltage supply control section, a voltage level detection section, and a voltage monitor section, a control device), and a memory 28. The interface connector 20 is connected to a signal supply source and a battery. The transmission device circuit 21 is configured to process signals from the signal supply source. The timing controller 22 is configured to supply signals from the transmission device circuit 21 to the liquid crystal panel 11. The touch panel controller 23 is configured to process position detection signals from the touch panel 13. The step-down converter 24 is configured to reduce a power supply voltage from the battery. The drive voltage output section 25 is configured to output a drive voltage to the gate driver 11B. The LED drive circuit 26 is configured to drive the LED elements 12A with using the power supply voltage (a first voltage) from the battery. The MCU 27 is configured to control the transmission device circuit 21 and the LED drive circuit 26. Data that is referred to by the MCU 27 is stored in the memory 28.

Various kinds of signals from the signal supply source are supplied to the transmission device circuit 21 via the interface connector 20 and a power source voltage from the battery is supplied to the step-down converter 24 and the LED drive circuit 26 via the interface connector 20. The power source voltage supplied from the battery is about 13V, for example. The transmission device circuit 21 is configured to process and convert the various kinds of signals from the interface connector 20 and supply converted signals to the timing controller 22, the touch panel controller 23, and the MCU 27. The timing controller 22 is configured to output image signals supplied from the transmission device circuit 21 to the source driver 11A and output scan signals to the gate driver 11B at a predefined timing, respectively. The touch panel controller 23 is configured to process the position detection signals from the touch panel 13 and output processed signals to the transmission device circuit 21. The step-down converter 24 is configured to reduce the power supply voltage supplied via the interface connector 20 and obtain a drive voltage that is lower than the power supply voltage and output the obtained drive voltage to the transmission device circuit 21, the timing controller 22, the touch panel controller 23, the drive voltage output section 25, and the MCU 27. The drive voltage output from the step-down converter 24 is about 3V, for example. The transmission device circuit 21, the timing controller 22, the touch panel controller 23, and the MCU 27 are configured to be driven based on the drive voltage from the step-down converter 24. The drive voltage output section 25 is configured to output the drive voltage from the step-down converter 24 to the gate driver 11B and drive the gate driver 11B.

The LED drive circuit 26 is configured to increase the power supply voltage supplied via the interface connector 20 and generate a drive voltage (a second voltage) to be supplied to the LED elements 12A. More specifically, the LED elements 12A are serially connected to each other and configured as a LED element row (a string). With one LED element row or multiple LED element rows being connected to the LED drive circuit 26, the drive voltage to be supplied to the one LED element row or the multiple LED element rows is higher than the power supply voltage supplied to the LED drive circuit 26 via the interface connector 20. The LED drive circuit 26 is configured to increase the power source voltage supplied via the interface connector 20 and generate the drive voltage to be supplied to the one LED element row or the multiple LED element rows. For instance, when the drive voltage to be supplied to one LED element 12A is 3V and one LED element row includes ten LED elements 12A that are serially connected to each other, the LED drive circuit 26 increases the power supply voltage of 13V that is supplied via the interface connector 20 to 30V. The drive voltage to be supplied to the LED element 12A is not necessarily 3V but may be 3.2V or 3.6V and is not limited to these specific values. The drive voltage (30V, for example) to be supplied to the LED element row from the LED drive circuit 26 may be obtained by multiplying the drive voltage (3V, for example) to be supplied to the LED element 12A by the number of LED elements 12A (ten, for example) included in the LED element row. Instead, the drive voltage to be supplied to the LED element row from the LED drive circuit 26 may be a value (31V or 32V, for example) obtained by adding a predefined voltage (0.5V, for example) to the voltage obtained as described above (30V) to protect ground fault. The LED drive circuit 26 is configured to supply the generated drive voltage to the LED elements 12A as a pulse signal and drive the LED elements 12A. Namely, the LED drive circuit 26 is configured to control the LED elements 12A with pulse width modulation (PWM) to adjust the amount of light rays emitted by the LED elements 12A.

The MCU 27 is a semiconductor device that includes a central processing unit (CPU) and performs a calculation process. The MCU 27 generates PWM signals based on various kinds of signals supplied from the transmission device circuit 21 and outputs the PWM signals to the LED drive circuit 26 and controls the LED drive circuit 26. When performing the local dimming control, the MCU 27 obtains luminance information of an image to be displayed on the liquid crystal panel 11 based on the various kinds of signals supplied from the timing controller 22. The MCU 27 can generate and output PWM signals based on the luminance information to control the amount of light rays emitted by the LED elements 12A. The LED drive circuit 26 may have the function of generating PWM signals.

The MCU 27 controls a duty ratio of the voltage supply time (ON time) during which the drive voltage is supplied to the LED elements 12A from the LED drive circuit 26 and the voltage non-supply time (OFF time) during which the drive voltage is not supplied to the LED elements 12A from the LED drive circuit 26. Accordingly, the MCU 27 controls the LED elements 12A with the PWM. In this embodiment, one period of a cycle at which the voltage supply time and the voltage non-supply time are repeated is 2 ms and a frequency is 500 Hz, for example. As the duty ratio of the voltage supply time becomes higher, the amount of light rays emitted by the LED elements 12A tends to increase, and as the duty ratio of the voltage non-supply time becomes higher, the amount of light rays emitted by the LED elements 12A tends to decrease. When the duty ratio of the voltage supply time is 100%, the amount of light rays emitted by the LED elements 12A is greatest. When the duty ratio of the voltage non-supply time is 100%, the LED elements 12A are not lighted. The MCU 27 can detect a voltage level related to the power supply voltage that is supplied to the LED drive circuit 26 from the battery. The MCU 27 has a function of detecting the voltage level related to the power supply voltage (a voltage level detecting function) in addition to a function of performing the PWM control of the LED elements 12A (a PWM control function). The memory 28 stores data to which the MCU 27 refers and data can be written in the memory 28 by the MCU 27. The memory 28 may be outside the MCU 27 or may be included in the MCU 27.

Furthermore, the MCU 27 has a function of monitoring a voltage level relative to the power supply voltage that is supplied to the LED drive circuit 26 from the battery (a voltage monitoring function) in addition to the PWM control function and the voltage level detecting function. The monitoring device 30 includes the MCU 27, the LED drive circuit 26, and the memory 28. The voltage monitoring device 30 is included in the liquid crystal display device 10. When monitoring a voltage level, the MCU 27 periodically detects a voltage level relative to the power supply voltage and compares the detected voltage level with a threshold stored in the memory 28 and determine whether the voltage level is greater than the threshold. The MCU 27 includes a step-down circuit (a voltage divider) and an analog-digital converter (ADC) circuit. The step-down circuit is configured to reduce the power supply voltage inputted to the LED drive circuit 26 via the interface connector 20 and obtain a monitoring voltage. The ADC circuit is configured to convert the monitoring voltage to a voltage level, which is digital data. Specifically, the MCU 27 obtains the monitoring voltage of about 3V via the step-down circuit and obtains ADC values representing 1,024 different voltage levels within a range from 0V to 3V with the ADC circuit. The 1,024 ADC values include various values from a smallest value to a greatest value related to the monitoring voltage. The specific number of the ADC values obtained with the ADC circuit may be greater or smaller than 1,024. With the MCU 27 monitoring the power supply voltage, the liquid crystal display device 10 can be stopped safely if the fluctuation of the power supply voltage becomes too large and a required drive voltage cannot be obtained. To stop the liquid crystal display device 10, the MCU 27 may output a signal for stopping the liquid crystal display device 10 to the timing controller 22. Accordingly, the liquid crystal display device 10 is less likely to be stopped unintentionally due to the excessive drop of the power source voltage. Errors are less likely to be caused in each of the devices (the liquid crystal panel 11, the drivers 11A, 11B) included in the liquid crystal display device 10. The voltage monitoring device 30 may monitor the voltage level relative to the power supply voltage supplied to the step-down converter 24 from the battery.

The backlight 12 according to this embodiment includes four groups of the LED elements 12A (the LED element rows) and each of the groups includes the LED elements 12A that are serially connected. A direct current of 100 mA is supplied to each of the groups and a direct current of 400 mA in total is supplied to the groups to turn on the LED elements 12A included in each of the groups. For example, when a resistance value relative to a circuit of the LED elements 12A is 1Ω, the voltage may reduce by about 400 mV during the voltage supply time where the drive voltage is supplied to the LED elements 12A from the LED drive circuit 26 unlike the voltage non-supply time where the drive voltage is not supplied to the LED elements 12A from the LED drive circuit 26. Namely, the voltage level relative to the drive voltage that is supplied to the LED elements 12A during the voltage supply time is lowered by about 400 mV compared with the voltage level relative to the drive voltage that is supplied to the LED elements 12A during the voltage non-supply time. Such fluctuation in the voltage level may affect the power source voltage that is supplied from the battery to the LED drive circuit 26 via the interface connector 20. Therefore, if the voltage level is always compared with one exclusive specified threshold to determine whether the voltage level is correct or not in monitoring the power supply voltage with the MCU 27, erroneous determination is likely to be made. Specifically, if the power supply voltage becomes lower than the specific threshold due to the drop of the power supply voltage according to the current flow to the LED elements 12A, the backlight 12 is stopped and turned off temporally in response to a signal from the voltage monitoring device and this allows the power supply voltage to recover its original voltage. Then, the power supply voltage becomes greater than the threshold and the backlight 12 is driven with the voltage monitoring device and is turned on again. This drops the power supply voltage again and the backlight 12 is stopped and turned off with the voltage monitoring device. Thus, the backlight 12 is turned on and off repeatedly and periodically.

In the monitoring device 30 according to this embodiment, the MCU 27 monitors the power supply voltage in synchronization with the PWM control of the LED elements 12A and determines the voltage level related to the power supply voltage based on a first threshold Vth1 and a second threshold Vth2. A power supply voltage monitoring process performed by the voltage monitoring device 30 according to this embodiment will be described with reference to FIG. 8. If determining that it is time to detect a voltage level related to the power supply voltage (S1: YES), the MCU 27 determines whether the detection timing is in the voltage non-supply time during which no drive voltage is supplied to the LED elements 12A from the LED drive circuit 26 or the voltage supply time during which the drive voltage is supplied to the LED elements 12A (S2).

Specifically, when determining that the detection timing is in the voltage supply time (ON time), the MCU 27 outputs an ON time signal, which instructs supply of the drive voltage from the LED drive circuit 26 to the LED elements 12A, to the LED drive circuit 26. When determining that the detection timing is in the non-voltage supply time (OFF time), the MCU 27 outputs an OFF time signal, which instructs no-supply of the drive voltage from the LED drive circuit 26 to the LED elements 12A, to the LED drive circuit 26.

If determining that the detection timing is in the voltage non-supply time (S2: NO), the MCU 27 detects a voltage level related to the power supply voltage and compares the detected voltage level with the first threshold Vth1. If determining that the detection timing is in the voltage supply time (S2: YES), the MCU 27 detects a voltage level related to the power supply voltage and compares the detected voltage level with the second threshold Vth2 that is different from the first threshold Vth1. The first threshold Vth1 and the second threshold Vth2 are converted into ADC values and the ADC values are stored in the memory 28. The second threshold Vth2 is smaller than the first threshold Vth1. A difference between the first threshold Vth1 and the second threshold Vth2 is substantially same as an amount of voltage drop that is supposed to be caused when the drive voltage is supplied to the LED elements 12A during the voltage supply time and may be about 400 mV. The memory 28 includes a counter 29. The counter 29 counts the number of times that the MCU 27 continuously detects that the voltage level related to the detected power supply voltage is smaller than the first threshold Vth1 or the second threshold Vth2.

If the MCU 27 determines that the detection timing of detecting a voltage level is in the voltage non-supply time (S2: NO), the MCU 27 detects a voltage level and compares the detected voltage level with the first threshold Vth1 (S10). If determining that the detection timing is in the voltage supply time (S2: YES), the MCU 27 detects a voltage level and compares the detected voltage level with the second threshold Vth2 (S30). If determining that the detected voltage level is higher than the first threshold Vth1 or the second threshold Vth2 (S10: YES, S30: YES), the detected voltage level is good and effective and the MCU 27 continues supplying the drive voltage from the LED drive circuit 26 to the LED elements 12A. If the MCU 27 determines that the detected voltage level is lower than the first threshold Vth1 or the second threshold Vth2 (S10: NO, S30: NO), the counter 29 of the memory 28 is counted up by one (S11, S31). The detected voltage level is not good and the supply of the drive voltage from the LED drive circuit 26 to the LED elements 12A may be stopped according to the determination performed after the comparison (S14, S34).

The second threshold Vth2 that is a reference value for determining a voltage level during the voltage supply time is lower than the first threshold Vth1 that is a reference value for determining a voltage level during the voltage non-supply time. Therefore, the determination of a voltage level is less influenced by the drop of the power supply voltage that is caused by the supply of the drive voltage during the voltage supply time. This reduces erroneous determination regarding the voltage level of the power supply voltage and the voltage monitoring can be properly performed. With less occurrence of the erroneous determination, the backlight 12 is less likely to be periodically and repeatedly turned on and off.

The MCU 27 periodically detects a voltage level relative to the power supply voltage and such a periodical cycle is 1 ms, for example. Every time the MCU 27 detects a voltage level at a periodical cycle (every 1 ms, S1), the MCU 27 compares the detected voltage level with the first threshold Vth1 or the second threshold Vth2 (S10, S30). Then, if determining that the number of times (a counter value in the counter 29) the MCU 27 continuously detects that the detected voltage level is lower than the first threshold Vth1 or the second threshold Vth2 reaches a reference number (S12: YES, S32: YES), the MCU 27 controls the LED drive circuit 26 to stop the supply of the drive voltage and terminates the monitoring of the power supply voltage and clear the counter 29 to zero (S14, S34).

If determining that the detected voltage level is higher than the first threshold Vth1 or the second threshold Vth2 (S10: YES, S30: YES) before the number of times (the counter value) the MCU 27 continuously detects that the detected voltage level is lower than the first threshold Vth1 or the second threshold Vth2 reaches the reference number (three in this embodiment), the MCU 27 controls the LED drive circuit 26 to continue or temporally stop the supply of the drive voltage and continues monitoring the power supply voltage (S18, S38, S1). Even if the supply of the drive voltage is temporally stopped, the voltage level of the power supply voltage momentarily drops and promptly recovers the normal voltage level again. Therefore, the liquid crystal display device 10 can be continuously used without any problems. In such a case, with the monitoring device of this embodiment, the supply of the drive voltage is not stopped unnecessarily.

In this embodiment, the reference number is three, for example. The periodic cycle of detecting a voltage level with the MCU 27 is about 1 ms and the periodic cycle of repeating the voltage supply time and the voltage non-supply time is about 2 ms. The MCU 27 performs time switching between the voltage supply time and the voltage non-supply time before the counter value in the counter 29 reaches the reference number. The condition for such time switching is represented by the following formula (1). In the formula (1), T1 represents the periodic cycle of repeating the voltage supply time and the voltage non-supply time with the MCU 27, T2 represents the periodic cycle of detecting the voltage level of the power supply voltage with the MCY 27, and n represents the reference number of times.

$$n \cdot T2 > T1 \quad \text{Formula (1)}$$

If the number of times the MCU 27 continuously detects a low voltage level reaches the reference number (if the counter value is three), the monitoring of the power supply voltage may be influenced by the voltage fluctuation caused by the switching between the voltage supply time and the voltage non-supply time. In this respect, the MCU 27 compares the voltage level of the power supply voltage with the first threshold Vth1 in the voltage non-supply time and with the second threshold Vth2 in the voltage supply time and it can be determined whether the voltage level is effective or not. Even if the number of times the ECU 27 continuously determines that the voltage level is low and is not effective reaches the reference number, the power supply voltage can be appropriately monitored without being influenced by the voltage fluctuation caused by the switching between the voltage supply time and the voltage non-supply time. This is particularly effective when the periodic cycle of repeating the voltage supply time and the voltage non-supply time is short.

If determining that the detected voltage level is higher than the first threshold (S10: YES) during the voltage non-supply time (S2: NO), the MCU 27 compares the detected voltage level with a third threshold Vth3 that is greater than the first threshold Vth1 (S16). If determining that the detected voltage level is higher than the second threshold (S30: YES) during the voltage supply time (S2: YES), the MCU 27 compares the detected voltage level with a fourth threshold Vth4 that is higher than the second threshold Vth2 (S36).

The first threshold Vth1 and the third threshold Vth3 that are used during the voltage non-supply time and the second threshold Vth2 and the fourth threshold Vth4 that are used during the voltage supply time are converted to ADC values and the ADC values are stored in the memory 28. The fourth threshold Vth4 is smaller than the third threshold Vth3. A difference between the first threshold Vth1 and the third threshold Vth3 is greater than the difference between the first threshold Vth1 and the second threshold Vth2 and is about 600 mV. A difference between the second threshold Vth2 and the fourth threshold Vth4 is same as the difference between the first threshold Vth1 and the third threshold Vth3 and is about 600 mV. A difference between the third threshold Vth3 and the fourth threshold Vth4 is same as the difference between the first threshold Vth1 and the second threshold Vth2 and is about 400 mV.

If detecting a voltage level that is higher than the third threshold Vth3 or the fourth threshold Vth4 (S16: YES, S36: YES) before the number of times (the counter value) the MCU 27 continuously detects that the detected voltage level is lower than the first threshold Vth1 or the second threshold Vth2 reaches the reference number, that is, if the counter value in the counter 29 is two or smaller (S12: NO, S32: NO), the MCU 27 clears the counter 29 to zero and continues supplying the drive voltage from the LED drive circuit 26 and monitoring the power supply voltage (S17, S37, S1). If detecting a voltage level that is higher than the first threshold Vth1 (S10: YES) and lower than the third threshold Vth3 (S16: NO) or detecting a voltage level that is higher than the second threshold Vth2 (S30: YES) and lower than the fourth threshold Vth4 (S36: NO) before the number of times the MCU 27 continuously detects that the detected voltage level is lower than the first threshold Vth1 or the second threshold Vth2 reaches the reference number (when the counter value is two or smaller), the MCU 27 controls the LED drive circuit 26 to temporally stop the supply of the drive voltage and continues monitoring the power supply voltage (S18, S38, S1). When the power supply voltage recovers its normal voltage level after the supply of the drive voltage is temporally stopped, the MCU 27 controls the LED drive circuit 26 to start supplying the drive voltage again.

If detecting a voltage level that is higher than the first threshold Vth1 or the second threshold Vth2 before the number of times the MCU 27 continuously detects that the detected voltage level is lower than the first threshold Vth1 or the second threshold Vth2 reaches the reference number (when the counter value is two or smaller), the MCU 27 can determine whether to temporally stop or continue the supply of the drive voltage based on the third threshold Vth3 or the fourth threshold Vth4 while continuing the monitoring of the power supply voltage. Thus, the power supply voltage that is fluctuated can be monitored more appropriately.

Figure 8:
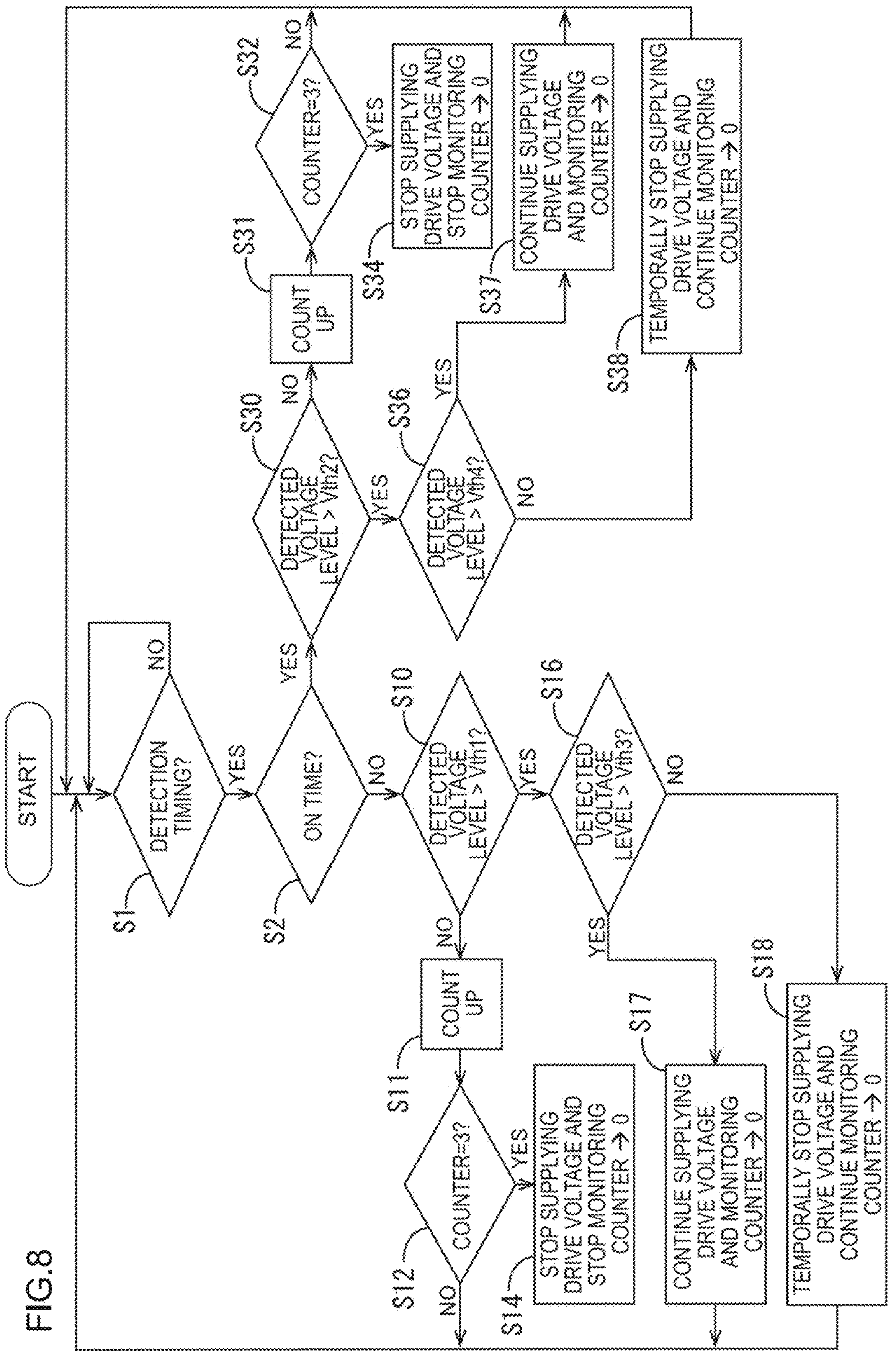
FIG. 8 is a flowchart illustrating a voltage monitoring process performed by the voltage monitoring device according to the first embodiment.

Next, a voltage monitoring process performed by the MCU 27 will be described in detail with reference to the time charts illustrated in FIGS. 2 to 5 and the flowchart illustrated in FIG. 8. First, the process performed when the MCU 27 controls the LED elements 12A with the PWM control (the duty ratio of the voltage supply time and the voltage non-supply time is not constant) will be described with reference to FIGS. 2 and 3.

Figure 2:
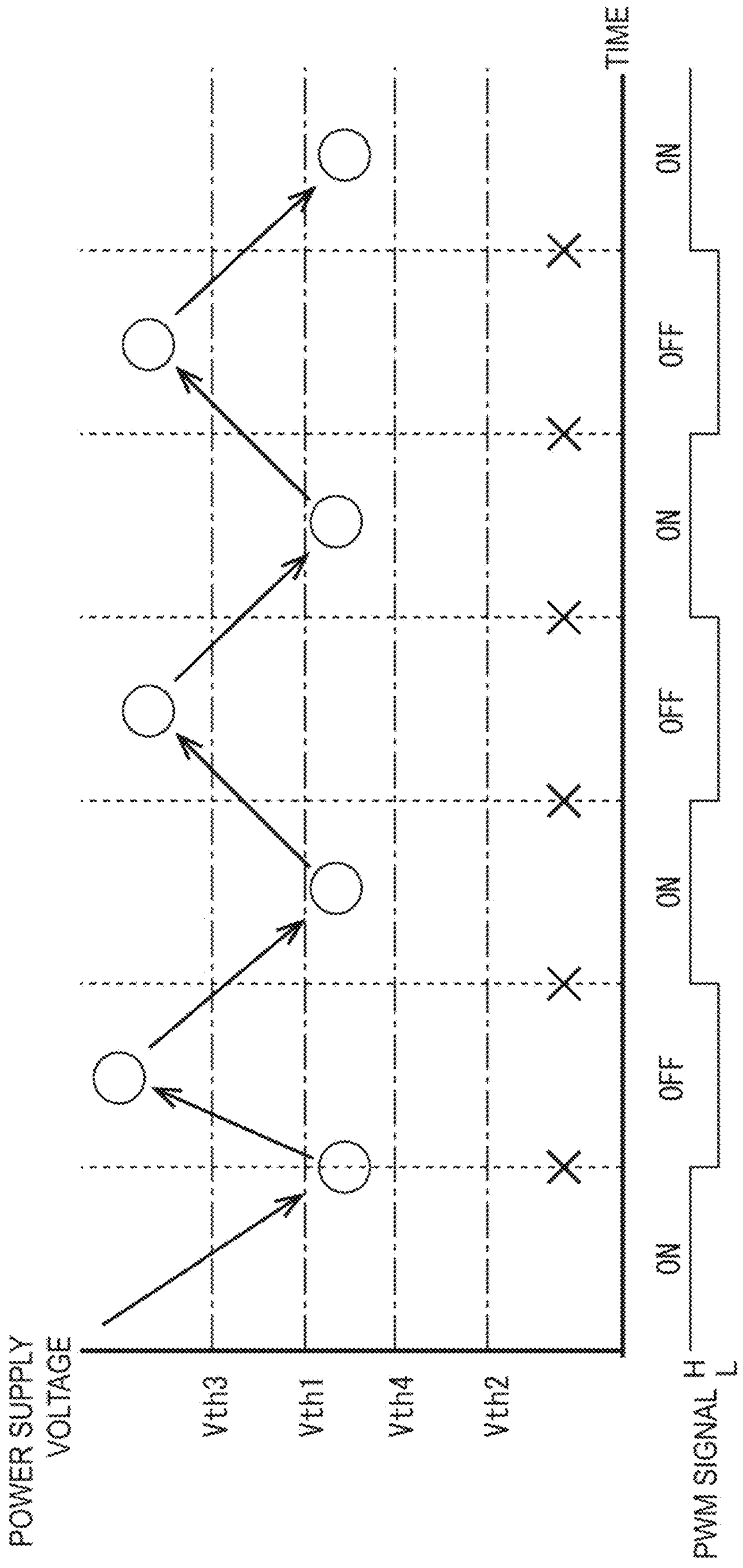
FIG. 2 is a time chart illustrating a relation between PWM signals and timing of detection of a power supply voltage by an MCU.
Figure 3:
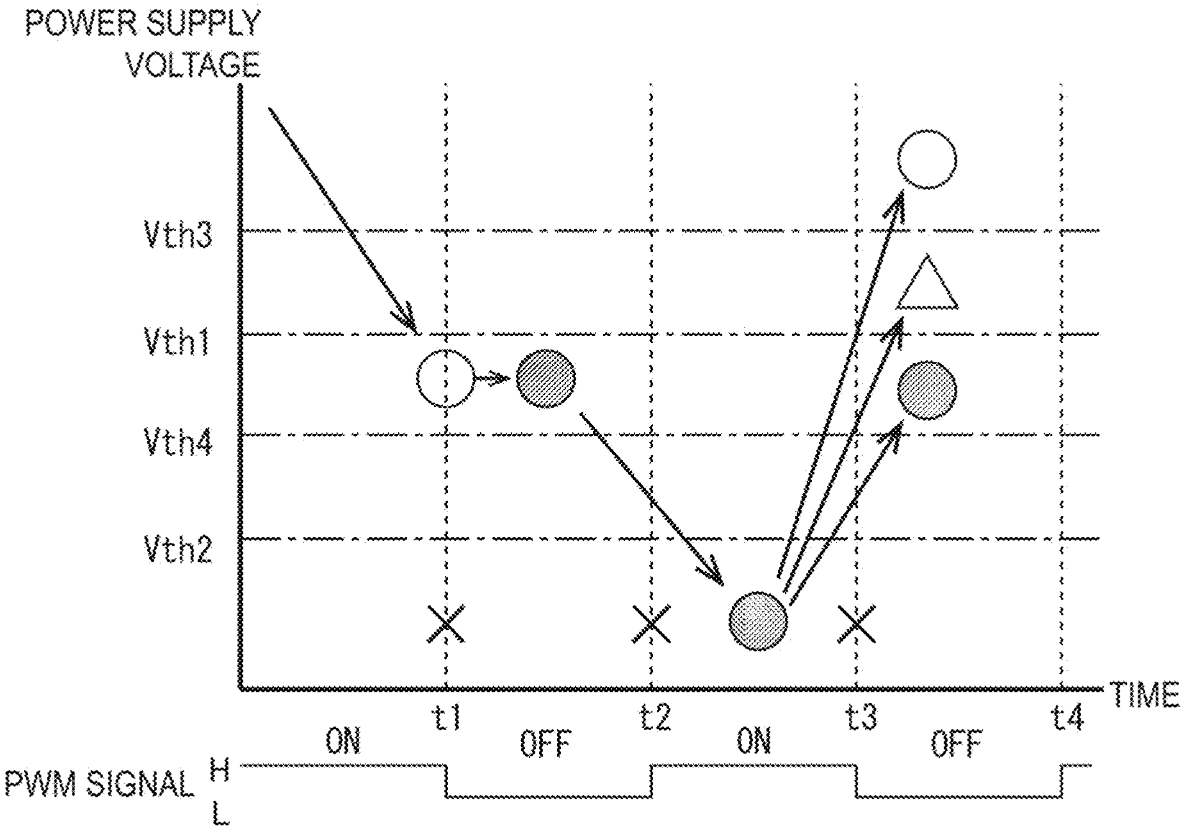
FIG. 3 is a time chart illustrating the same relation as that in FIG. 2 when a power supply voltage lower than a first threshold or a second threshold is continuously detected twice by the MCU.

FIG. 2 is a time chart representing a relation of the timing at which the MCU 27 detects the power supply voltage and the PWM signals. The lateral axis in FIG. 2 represents the time and the vertical axis represents the power supply voltage. FIG. 3 is a time chart illustrating the same relation as that in FIG. 2 when the power supply voltage lower than the first threshold Vth1 or the second threshold Vth2 is continuously detected twice by the MCU 27. In FIGS. 2 and 3, the power supply voltages that are detected by the MCU 27 are plotted. The power supply voltages that are higher than the third threshold Vth3 or the fourth threshold Vth4 are depicted with white circular marks (○), the power supply voltages that are lower than the first threshold Vth1 or the second threshold Vth2 is depicted with black circular marks (●), and the power supply voltage that is higher than the first threshold Vth1 and lower than the third threshold Vth3 and the power supply voltage that is higher than the second threshold Vth2 and lower than the fourth threshold Vth4 are depicted with a triangular mark.

In FIGS. 2 and 3, the timing at which the MCU 27 detects a power supply voltage is depicted with x. In FIGS. 2 and 3, the waveforms of the PWM signals that are created by the MCU 27 are illustrated. The high electric potential H and the low electric potential L are described in FIGS. 2 and 3. The high electric potential H is outputted to the LED drive circuit 26 when the PWM signal representing the voltage supply time is an ON signal and the low electric potential L is outputted to the LED drive circuit 26 when the PWM signal is an OFF signal. The voltage supply time is represented by ON and the voltage non-supply time is represented by OFF. In FIGS. 2 and 3, the duty ratio of the voltage supply time and the voltage non-supply time is 50:50.

As illustrated in FIG. 2, the power supply voltage detected by the MCU 27 in the voltage supply time is lower than the power supply voltage detected by the MCU 27 in the voltage non-supply time. It is obvious from FIG. 2 that the power supply voltage drops according to the supply of the drive voltage to the LED elements 12A from the LED drive circuit 26 in the voltage supply time. Specifically, the power supply voltage detected by the MCU 27 increases and decreases repeatedly between the voltage non-supply time and the voltage supply time even though the substantial power supply voltage without having influences of the voltage drop does not change. Namely, the power supply voltage detected by the MCU 27 fluctuates so as to have an opposite phase from the period of the PWM signals. As the power supply voltage becomes lower, the voltage drop amount tends to be larger and the fluctuation of the power supply voltage tends to be greater.

The MCU 27 determines whether the detection timing at which the voltage level related to the power supply voltage, which fluctuates as described above, is in the voltage non-supply time in which the power supply voltage is not supplied to the LED elements 12A from the LED drive circuit 26 or the voltage supply time in which the power supply voltage is supplied to the LED elements 12A from the LED drive circuit 26 (S2). This determination may be made based on the signals sent from the transmission device circuit 21.

If determining that the detection timing is in the voltage non-supply time (S2: NO), the MCU 27 detects a voltage level and reads the first threshold Vth1 from the memory 28 and compares the detected voltage level with the first threshold Vth1 (S10). If determining that the detected voltage level is higher than the first threshold Vth1 (S10: YES), the MCU 27 reads the third threshold Vth3 from the memory 28 and compares the detected voltage level with the third threshold Vth3 (S16). If determining that the detection timing is in the voltage supply time (S2: YES), the MCU 27 detects a voltage level and reads the second threshold Vth2 from the memory 28 and compares the detected voltage level with the second threshold Vth2 (S30). If determining that the detected voltage level is higher than the second threshold Vth2 (S30: YES), the MCU 27 reads the fourth threshold Vth4 from the memory 28 and compares the detected voltage level with the fourth threshold Vth4 (S36).

It is determined that the voltage levels related to the power supply voltages are higher than the third threshold Vth3 and the fourth threshold Vth4 in all the voltage non-supply time and the voltage supply time, respectively (S16: YES, S36: YES) in FIG. 2. This means that the power supply voltages are sufficiently high. Then, the MCU 27 clears the counter 29 and continues supplying the drive voltage from the LED drive circuit 26 and monitoring the power supply voltage (S17, S37, S1). In FIG. 2, the timing at which the PWM signal is switched between ON (the voltage supply time) and OFF (the voltage non-supply time) coincides with the detection timing at which the voltage level related to the power supply voltage is detected.

According to FIG. 3, it is determined that the voltage level related to the power supply voltage detected by the MCU 27 in the first voltage supply time (at the time t1) is higher than the fourth threshold Vth4 (S36: YES) and the voltage level related to the power supply voltage detected by the MCU 27 in the first voltage non-supply time (at the time t2), which comes subsequent to the first voltage supply time (t1), is lower than the first threshold Vth1 (S10: NO). Then, the counter 29 is counted up by 1 (S11) and it is determined that the voltage level related to the power supply voltage detected by the MCU 27 in the second voltage supply time (at the time t3), which comes subsequent to the first voltage non-supply time (t2), is lower than the second threshold Vth2 (S30: NO). Then, the counter 29 is counted up by 1 (S31) and the counter value in the counter 29 is 2.

In FIG. 2, the voltage level related to the power supply voltage that is lower than the first threshold Vth1 or the second threshold Vth2 is continuously detected twice by the MCU 27 (the counter value is 2). It is determined whether the supply of the drive voltage and the monitoring of the power supply voltage are to be performed according to the voltage level related to the power supply voltage that is detected by the MCU 27 in the second voltage non-supply time (at the time t4) which comes subsequent to the second voltage supply time (t3).

For instance, if the MCU 27 determines that the voltage level related to the power supply voltage detected by the MCU 27 in the voltage non-supply time (t4) is higher than the third threshold Vth3 (S16: YES, ○ in FIG. 3) after two continuous determination that the voltage level related to the power supply voltage is lower than the first threshold Vth1 or the second threshold Vth2 (the counter value is 2), which is after the second voltage supply time (t3), the power supply voltage increases to a required level and therefore, the MCU 27 clears the counter 29 and continues supplying the drive voltage from the LED drive circuit 26 and monitoring the power supply voltage (S17, S1). On the other hand, if the MCU 27 determines that the voltage level related to the power supply voltage detected by the MCU 27 in the voltage non-supply time (t4) is lower than the first threshold Vth1 (S10: NO, ● in FIG. 3) after two continuous determination that the voltage level related to the power supply voltage is lower than the first threshold Vth1 or the second threshold Vth2 (the counter value is 2), which is after the second voltage supply time (t3), the counter 29 is counted up by 1 (S11) and the counter value becomes 3. Since the counter value in the counter 29 reaches the reference number (S12: YES), the MCU 27 clears the counter 29 and controls the LED drive circuit 26 to stop supplying the drive voltage and stops monitoring the power supply voltage (S14). The backlight 12 is turned off.

If the MCU 27 determines that the voltage level related to the power supply voltage is higher than the first threshold Vth1 (S10: YES) and lower than the third threshold Vth3 (S16: NO, a triangular mark in FIG. 3) after two continuous determination that the voltage level related to the power supply voltage is lower than the first threshold Vth1 or the second threshold Vth2 (the counter value is 2), which is after the second voltage supply time (t3), the counter 29 is not counted up and the counter value is 2. The MCU 27 controls the LED drive circuit 26 to temporally stop supplying the drive voltage and increases the power supply voltage. The MCU 27 clears the counter 29 and continues monitoring the power supply voltage (S18, S1). When the power supply voltage recovers its normal voltage level after the supply of the drive voltage is temporally stopped, the MCU 27 controls the LED drive circuit 26 to start supplying the drive voltage again.

With the counter value being 2, if the MCU 27 determines that the voltage level related to the power supply voltage detected by the MCU 27 in the subsequent voltage supply time is higher than the second threshold Vth2 and the fourth threshold Vht4 (S30: YES, S36: YES), the MCU 27 continues supplying the drive voltage and monitoring the power supply voltage (S37, S1). With the counter value being 2, if the MCU 27 determines that the voltage level related to the power supply voltage detected by the MCU 27 in the subsequent voltage supply time is lower than the second threshold Vth2 (S30: NO), the counter 29 is counted by 1 (S31). Then, the counter value becomes 3 and reaches the reference number (S32: YES). The MCU 27 stops supplying the drive voltage and monitoring the power supply voltage (S34). The backlight 12 is turned off.

On the other hand, with the counter value being 2, if the MCU 27 determines that the voltage level related to the power supply voltage detected by the MCU 27 in the subsequent voltage supply time is higher than the second threshold Vth2 and lower than the fourth threshold Vht4 (S30: YES, S36: NO), the counter 29 is not counted up and the counter value is 2. The MCU 27 temporally stops supplying the drive voltage and increases the power supply voltage and clears the counter 29 and continues monitoring the power supply voltage (S38, S1). When the power supply voltage recovers its normal voltage level after the supply of the drive voltage is temporally stopped, the MCU 27 controls the LED drive circuit 26 to start supplying the drive voltage again.

Figure 4:
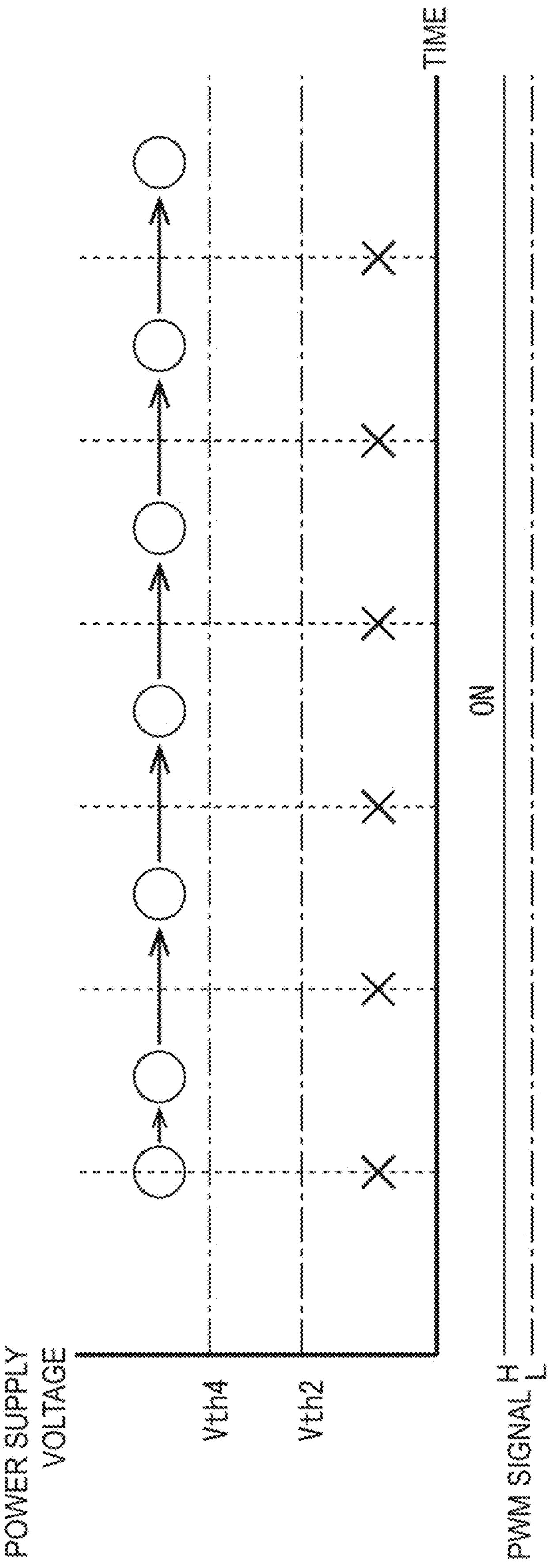
FIG. 4 is a time chart when a duty ratio of voltage supply time is 100%.
Figure 5:
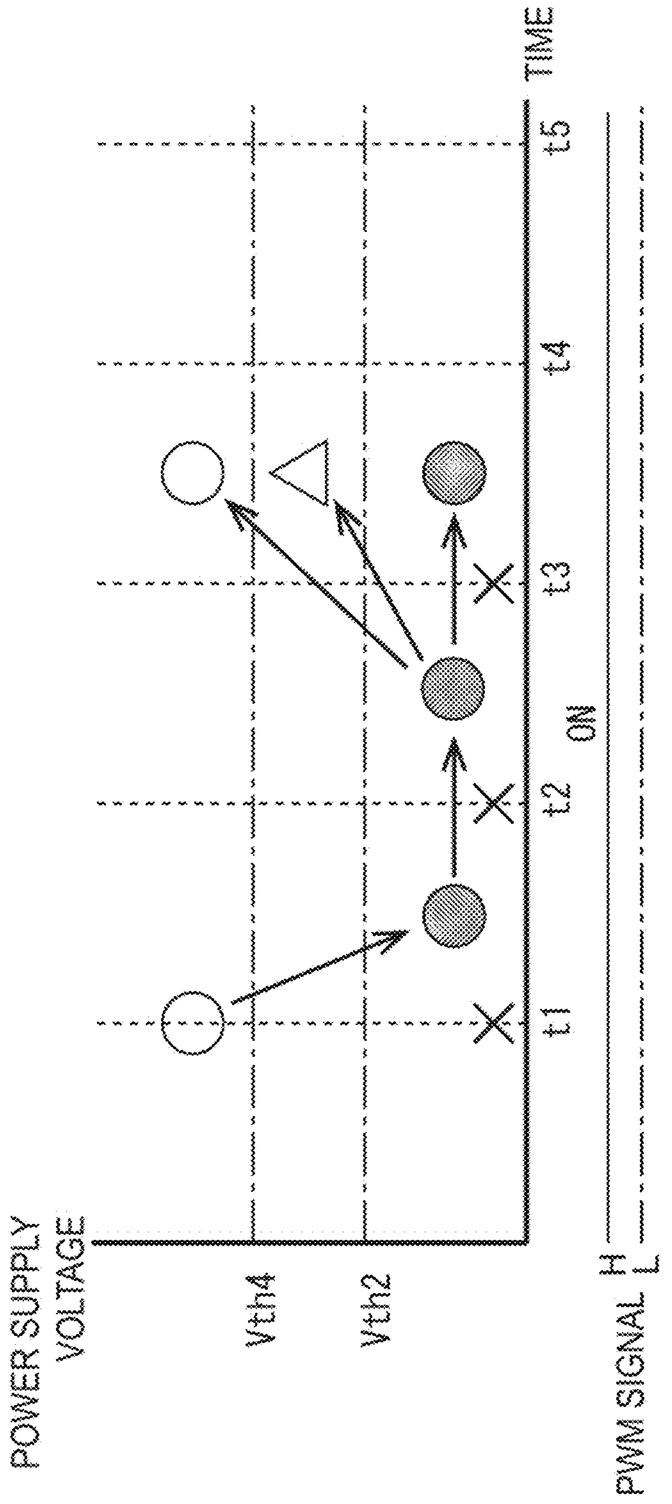
FIG. 5 is a time chart illustrating the same relation as that in FIG. 4 when a power supply voltage lower than the first threshold or the second threshold is continuously detected twice by the MCU.

Next, the monitoring process performed when the PWM control of the LED elements 12A is not performed and the duty ratio of the voltage supply time is always 100% will be described with reference to FIGS. 4 and 5. FIG. 4 is a time chart when the duty ratio of voltage supply time is 100%. FIG. 5 is a time chart illustrating the same relation as that in FIG. 4 when the power supply voltage lower than the first threshold or the second threshold is continuously detected twice by the MCU 27. The description in FIGS. 4 and 5 is similar to that in FIGS. 2 and 3 and will not be described.

The time chart in FIG. 4 includes only the voltage supply time since the PWM control of the LED elements 12A is not performed. The MCU 27 always reads the second threshold Vth2 and the fourth threshold Vth4 and compares the detected voltage level with the second threshold Vth2 or the fourth threshold Vth4 (S30, S36). In FIG. 4, the MCU 27 determines that the voltage level related to the detected power supply voltage is higher than the fourth threshold Vth4 in every voltage supply time (S30: YES, S36: YES). Therefore, the power supply voltage is effectively high. The MCU 27 continues supplying the drive voltage from the LED drive circuit 26 and monitoring the power supply voltage (S37, S1). In FIG. 4, the power supply voltage is constant.

In FIG. 5, the MCU 27 determines that the voltage level related to the power supply voltage detected by the MCU 27 at the timing t1 is higher than the second threshold Vth2 and the fourth threshold Vth4 (S30: YES, S36: YES) and determines that the voltage level related to the power supply voltage detected by the MCU 27 at the timing t2 is lower than the second threshold Vth2 (S30: NO) and the counter 29 is counted up by 1 and the counter value becomes 1 (S31). The MCU 27 determines that the voltage level related to the power supply voltage detected by the MCU 27 at the timing t3 is lower than the second threshold Vth2 (S30: NO) and the counter 29 is counted up by 1 and the counter value becomes 2 (S31). The voltage level related to the power supply voltage that is lower than the second threshold Vth2 is detected continuously detected twice by the MCU 27 and the counter value is 2. It is determined whether the supply of the drive voltage and the monitoring of the power supply voltage are to be performed according to the voltage level related to the power supply voltage that is detected by the MCU 27 in the subsequent time t4.

For instance, in FIG. 5, with the counter value being 2 at the timing t4after the voltage level related to the power supply voltage that is lower than the second threshold Vth2 is continuously detected twice by the MCU 27, if the MCU 27 determines that the voltage level related to the power supply voltage detected by the MCU 27 is higher than the second threshold Vth2 and the fourth threshold Vth4 (S30: YES, S36: YES), the power supply voltage is at a sufficient level and the MCU 27 continues supplying the drive voltage from the LED drive circuit 26 and clears the counter 29 and continues monitoring the power supply voltage (S37, S1).

On the other hand, with the counter value being 2 at the timing t4after the voltage level related to the power supply voltage that is lower than the second threshold Vth2 is continuously detected twice by the MCU 27, if the MCU 27 determines that the voltage level related to the power supply voltage detected by the MCU 27 is lower than the second threshold Vth2 (S30: NO), the counter 29 is counted up by 1 and the counter value becomes 3 and reaches the reference number (S32: YES). The MCU 27 clears the counter 29 and controls the LED drive circuit 26 to stop supplying the drive voltage and stops monitoring the power supply voltage (S34). The backlight 12 is turned off.

In FIG. 5, with the counter value being 2 at the timing t4after the voltage level related to the power supply voltage that is lower than the second threshold Vth2 is detected continuously detected twice by the MCU 27, if the MCU 27 determines that the voltage level related to the power supply voltage detected by the MCU 27 is higher than the second threshold Vth2 and lower than the fourth threshold Vth4 (S30: YES, S36: NO, a triangular mark in FIG. 5), the counter value is 2 and the MCU 27 controls the LED drive circuit 26 to temporally stop supplying the drive voltage to decrease the power supply voltage and clears the counter 29 and continues monitoring the power supply voltage (S38, S1). When the power supply voltage recovers its normal voltage level after the supply of the drive voltage is temporally stopped, the MCU 27 controls the LED drive circuit 26 to start supplying the drive voltage again.

In this example, if the MCU 27 determines that the voltage level related to the power supply voltage detected by the MCU 27 at the subsequent timing t5 is higher than the second threshold Vth2 and the fourth threshold Vth4 (S30: YES, S36: YES), the MCU 27 continues supplying the drive voltage and monitoring the power supply voltage (S37, S1). If the MCU 27 determines that the voltage level detected at the subsequent timing t5 is lower than the second threshold Vth2 (S30: NO), the counter 29 is counted up by 1 (S31) and the counter value becomes 1 and the MCU 27 continues supplying the drive voltage and monitoring the power supply voltage (S1). If the MCU 27 determines that the voltage level detected at the subsequent timing t5is higher than the second threshold Vth2 and lower than the fourth threshold Vth4 (S30: YES, S36: NO), the MCU 27 temporally stops supplying the drive voltage and continues monitoring the power supply voltage (S38, S1). When the power supply voltage recovers its normal voltage level after the supply of the drive voltage is temporally stopped, the MCU 27 controls the LED drive circuit 26 to start supplying the drive voltage again.

As described above, the voltage monitoring device 30 according to this embodiment includes the LED drive circuit 26 (a voltage supply device) that supplies the drive voltage (the second voltage) to the LED elements 12A, which are electric components, the MCU 27, and the memory 28 storing the first threshold Vth1 and the second threshold Vth2 that is lower than the first threshold Vth1. The MCU 27 is configured to control the LED drive circuit 26 as a voltage supply control section and determine whether the detection timing is in the voltage non-supply time where the drive voltage is supplied to the LED elements 12A from the LED drive circuit 26 or the voltage supply time where the drive voltage is not supplied to the LED elements 12A from the LED drive circuit 26. The MCU 27 is configured to control the duty ratio of the voltage non-supply time and the voltage supply time. The MCU 27 is further configured as the voltage level detection section to detect a voltage level related to a power supply voltage (the first voltage) that is supplied to the voltage monitoring device from the battery. The MCU 27 is further configured as the voltage monitor section to monitor the power supply voltage and to compare the voltage level with the first threshold Vth1 in the voltage non-supply time and compare the voltage level with the second threshold Vth2. If determining that the voltage level is higher than the first threshold Vth1 or the second threshold Vth2, the MCU 27 is configured to control the LED drive circuit 26 to continue supplying the drive voltage. If determining that the voltage level is lower than the first threshold Vth1 or the second threshold Vth2, the MCU 27 is configured to control the LED drive circuit 26 to stop supplying the drive voltage.

The LED elements 12A are provided with the drive voltage for driving by the LED drive circuit 26. The MCU 27 (the voltage supply control section) is configured to control the supply of the drive voltage from the LED drive circuit 26 to the LED elements 12A and configured to control the duty ratio of the voltage supply time where the drive voltage is supplied to the LED elements 12A and the voltage non-supply time where the drive voltage is not supplied to the LED elements.

The power supply voltage may fluctuate between the voltage supply time and the voltage non-supply time depending on the value of the current that flows to the LED elements 12A by the supply of the drive voltage. In the voltage supply time, the power supply voltage drops due to the supply of the drive voltage to the LED elements 12A and therefore, the voltage level related to the power supply voltage may be lower than the voltage level related to the power supply voltage in the voltage non-supply time where the drive voltage is not supplied to the LED elements 12A. Therefore, if the voltage level is always determined based on only one specific threshold in monitoring voltages, erroneous determination is likely to be made.

The MCU 27 (the voltage monitor section) is configured to monitor a voltage level related to the power supply voltage detected by the MCU 27 (the voltage level detection section) and to determine whether to continue or stop supplying the drive voltage to the LED elements 12A with using the first threshold Vth1 in the voltage non-supply time and using the second threshold Vth2 in the voltage supply time. Specifically, in the voltage non-supply time, the MCU 27 (the voltage monitor section) compares the voltage level detected by the MCU 27 (the voltage level detection section) with the first threshold Vth1 and if determining that the voltage level is higher than the first threshold Vth1, the MCU 27 controls the LED drive circuit 26 to continue supplying the drive voltage. If determining that the voltage level is lower than the first threshold Vth1, the MCU 27 controls the LED drive circuit 26 to stop supplying the drive voltage. On the other hand, in the voltage supply time, the MCU 27 (the voltage monitor section) compares the voltage level detected by the MCU 27 (the voltage level detection section) with the second threshold Vth2 that is lower than the first threshold Vth1 and if determining that the voltage level is higher than the second threshold Vth2, the MCU 27 controls the LED drive circuit 26 to continue supplying the drive voltage. If determining that the voltage level is lower than the second threshold Vth2, the MCU 27 controls the LED drive circuit 26 to stop supplying the drive voltage.

The second threshold Vth2 that is a determination reference for the voltage level related to the power supply voltage in the voltage supply time is lower than the first threshold Vth1 that is a determination reference for the voltage level related to the power supply voltage in the voltage non-supply time. Therefore, the voltage drop that is caused by the supply of the drive voltage in the voltage supply time is less likely to influence the determination of the voltage level. This reduces occurrence of the erroneous determination and the voltage monitoring can be performed appropriately.

The MCU 27 (the voltage level detection section) is configured to detect the voltage level periodically. If determining that the number of times of continuous detection that the voltage level is lower than the first threshold Vth1 or the second threshold Vth2 reaches the reference number, the MCU 27 (the voltage monitor section) controls the LED drive circuit 26 to stop supplying the drive voltage and stops monitoring the power supply voltage. If determining that the detected voltage level is higher than the first threshold Vth1 or the second threshold Vth2 before the number of times of continuous detection that the voltage level is lower than the first threshold Vth1 or the second threshold Vth2 reaches the reference number, the MCU 27 controls the LED drive circuit 26 to continue or temporally stop supplying the drive voltage and continues monitoring the power source voltage.

Every time the MCU 27 (the voltage level detection section) periodically detects a voltage level, the MCU 27 (the voltage monitor section) compares the detected voltage level with the first threshold Vth1 or the second threshold Vth2. The MCU 27 (the voltage monitor section) determines whether to supply a voltage and perform the voltage monitoring based on the determination whether the number of times of continuous detection that the voltage level is lower than the first threshold Vth1 or the second threshold Vth2 reaches the reference number. Therefore, the supply of the drive voltage is not stopped unnecessarily due to sudden voltage drop.

In the voltage non-supply time, the MCU 27 (the voltage monitor section) compares the voltage level with the first threshold Vth1 and the third threshold Vth3 that is higher than the first threshold Vth1. In the voltage supply time, the MCU 27 compares the voltage level with the second threshold Vth2 and the fourth threshold Vth4 that is higher than the second threshold Vth2 and lower than the third threshold Vth3. If determining that the detected voltage level is higher than the third threshold Vth3 or the fourth threshold Vth4 before the number of times of continuous detection that the voltage level is lower than the first threshold Vth1 or the second threshold Vth2 reaches the reference number, the MCU 27 controls the LED drive circuit 26 to continue supplying the drive voltage and continues monitoring the power source voltage. If determining that the detected voltage level is higher than the first threshold Vth1 and lower than the third threshold Vth3 or determining that the detected voltage level is higher than the second threshold Vth2 and lower than the fourth threshold Vth4 before the number of times of continuous detection that the voltage level is lower than the first threshold Vth1 or the second threshold Vth2 reaches the reference number, the MCU 27 controls the LED drive circuit 26 to temporally stop supplying the drive voltage and continues monitoring the power source voltage.

Every time the MCU 27 (the voltage level detection section) periodically detects a voltage level, the MCU 27 (the voltage monitor section) compares the detected voltage level with the first threshold Vth1 and the third threshold Vth3 or the second threshold Vth2 and the fourth threshold Vth4. If determining that the detected voltage level is higher than the first threshold Vth1 or the second threshold Vth2 before the number of times of continuous detection that the voltage level is lower than the first threshold Vth1 or the second threshold Vth2 reaches the reference number, the MCU 27 compares the detected voltage level with the third threshold Vth3, which is higher than the first threshold Vth1, or with the fourth threshold Vth4, which is higher than the second threshold Vth2. If determining that the detected voltage is higher than the third threshold Vth3 or the fourth threshold Vth4, the MCU 27 controls the LED drive circuit 26 to continue supplying the drive voltage and continues monitoring the power source voltage. If determining that the detected voltage is lower than the third threshold Vth3 or the fourth threshold Vth4, the MCU 27 controls the LED drive circuit 26 to temporally stop supplying the drive voltage and continues monitoring the power source voltage.

If determining that the detected voltage level is higher than the first threshold Vth1 or the second threshold Vth2 before the number of times of continuous detection that the voltage level is lower than the first threshold Vth1 or the second threshold Vth2 reaches the reference number, the MCU 27 (the voltage monitor section) determines whether to temporally stop supplying the drive voltage or continue supplying the drive voltage based on the third threshold Vth3 or the fourth threshold Vth4, while continuing monitoring the power source voltage. Accordingly, the power source voltage that fluctuates can be monitored more appropriately.

In the formula (1) previously described, T1 represents the periodic cycle of repeating the voltage supply time and the voltage non-supply time with the MCU 27 (the voltage supply control section), T2 represents the periodic cycle of detecting the voltage level of the power supply voltage with the MCU 27 (the voltage level detection section) and n represents the reference number. If the formula (1) is satisfied, the time related to the voltage supply is switched between the voltage supply time and the voltage non-supply time by the MCU 27 (the voltage supply control section) before the number of times the MCU 27 (the voltage level detection section) detects a low voltage level reaches the reference number. If the number of times the MCU 27 (the voltage level detection section) continuously detects a low voltage level reaches the reference number, the monitoring of the power supply voltage may be influenced by the voltage fluctuation caused by the switching between the voltage supply time and the voltage non-supply time. In this respect, according to the present embodiment, the MCU 27 (the voltage monitor section) determines whether to continue supplying the drive voltage or not with using different thresholds Vth1, Vth2 in the voltage non-supply time and the voltage supply time, respectively. Therefore, the power supply voltage can be appropriately monitored without being influenced by the voltage fluctuation caused by the switching between the voltage supply time and the voltage non-supply time when the number of times the MCU 27 (the voltage level detection section) detects the low voltage level reaches the reference number. This is particularly effective when the periodic cycle of repeating the voltage supply time and the voltage non-supply time is short.

The MCU 27 that is configured as the voltage monitor section is also configured as the voltage supply control section. According to such a configuration, the determination of the voltage level related to the power supply voltage easily synchronizes with the timing at which the PWM signal is switched between ON (the voltage supply time) and OFF (the voltage non-supply time). Accordingly, reliability of determining the voltage level with reference to the first threshold Vth1 in the voltage non-supply voltage is increased and reliability of determining the voltage level with reference to the second threshold Vth2 in the voltage supply voltage is increased. Therefore, voltage monitoring can be performed appropriately.

The backlight 12 (the lighting device) according to the present embodiment includes the above-described voltage monitoring device 30 and the LED elements 12A (a light source, an electric component) that emit light according to the supply of the drive voltage. According to such a backlight 12, the LED elements 12A (the electric component) emit light by the supply of the drive voltage from the LED drive circuit 26. The MCU 27 (the voltage supply control section) controls the duty ratio of the voltage supply time and the voltage non-supply time to control the amount of light that is emitted by the LED elements 12A. The MCU 27 (the voltage monitor section) determines whether to continue or stop supplying the drive voltage with using the different thresholds Vth1, Vth2 between the voltage non-display time and the voltage supply time. This reduces occurrence of erroneous determination and the LED elements 12A are less likely to blink.

The liquid crystal display device 10 (the display device) according to this embodiment includes the backlight 12 and a liquid crystal panel 11 (a display panel) that displays an image with using the light from the backlight 12. According to such a liquid crystal display device 10, the blinking of the LED elements 12A included in the backlight 12 is less likely to be caused, and therefore, display quality of images displayed on the liquid crystal panel 11 is good.

Second Embodiment

Figure 6:
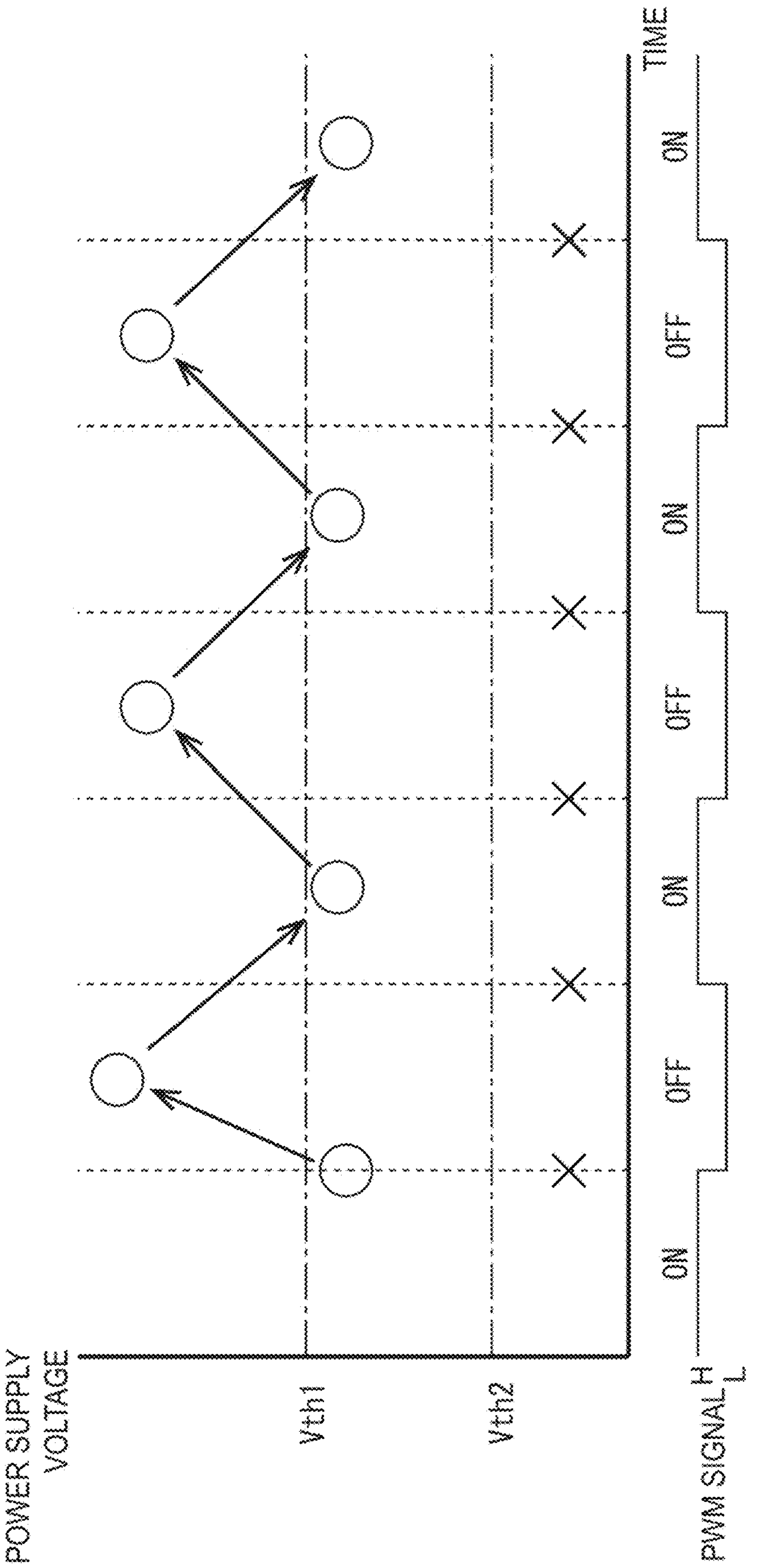
FIG. 6 is a time chart illustrating a relation between PWM signals and timing of detection of a power supply voltage by the MCU of a voltage monitoring device according to a second embodiment.
Figure 9:
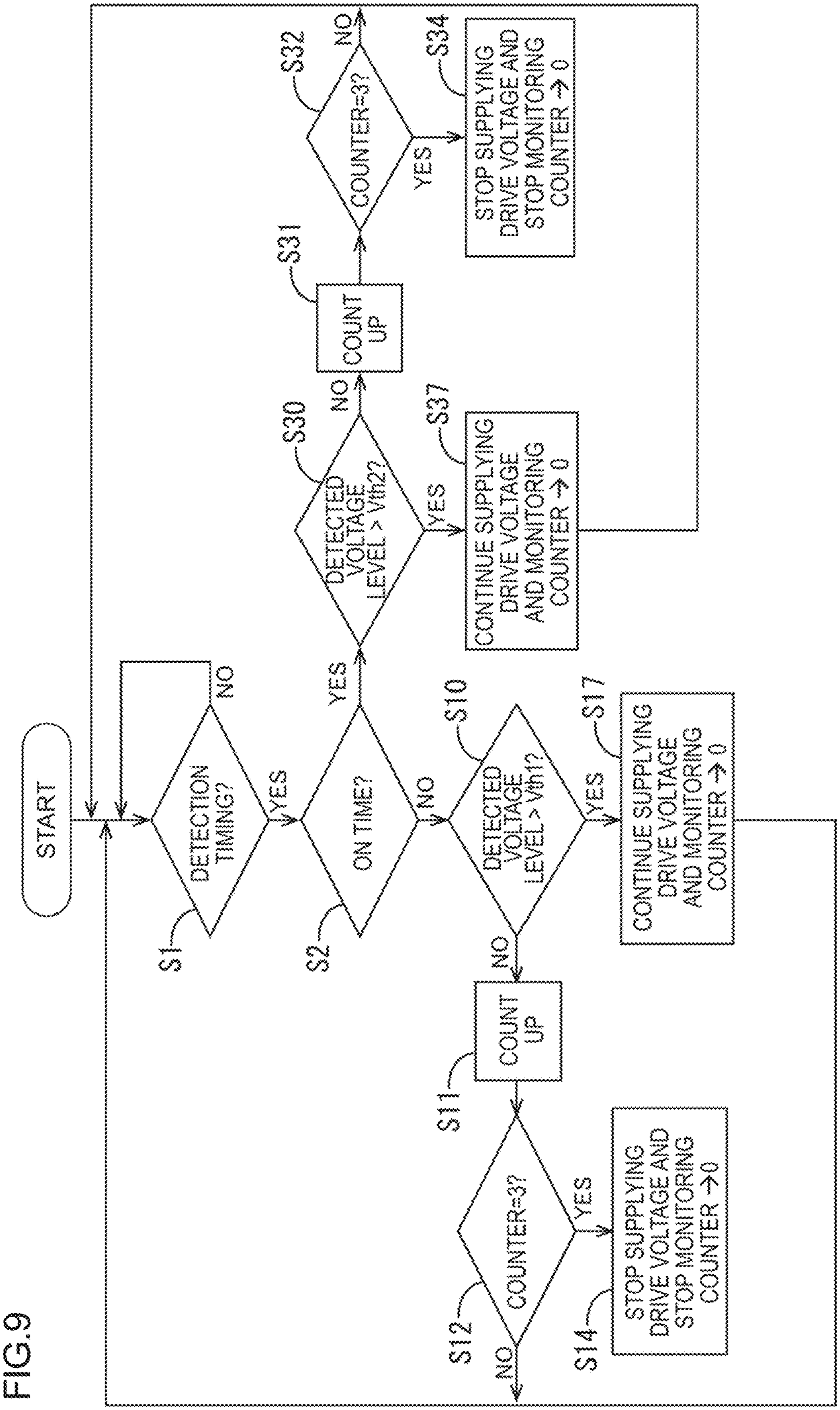
FIG. 9 is a flowchart illustrating a voltage monitoring process performed by a voltage monitoring device according to a second embodiment.

A second embodiment will be described with reference to FIGS. 6, 7, and 9. In the voltage monitoring device according to the second embodiment, the MCU 27 refers to thresholds that differ from those in the first embodiment. The configuration, operations, and effects same as those in the first embodiment will not be described.

The MCU 27 according to the present embodiment monitors the power supply voltage in synchronism with the PWM control of the LED elements 12A. The MCU 27 is configured to determine the voltage level related to the power supply voltage based on the first threshold Vth1 and the second threshold Vth2 and not to determine the voltage level based on the third threshold and the fourth threshold Vth4 unlike the first embodiment. Therefore, the memory 28 stores the first threshold Vth1 and the second threshold Vth2 but may not store the third threshold Vth3 and the fourth threshold Vth4.

Next, a voltage monitoring process according to the present embodiment will be described with reference to the time charts in FIGS. 6 and 7 and the flowchart in FIG. 9. The description in FIGS. 6 and 7 is similar to that in FIGS. 2 to 5 and will not be described. The voltage monitoring process when the MCU 27 performs the PWM control of the LED elements 12A (the duty ratio of the voltage supply time and the voltage non-supply time is not constant) will be described with reference to FIGS. 6 and 7. As illustrated in FIG. 6, the power supply voltage fluctuates and increases and drops repeatedly between the voltage non-supply time and the voltage supply time. The MCU 27 determines whether the detection timing of detecting a voltage level related to the power supply voltage that fluctuates is in the voltage non-supply time, where the power supply voltage is not supplied to the LED elements 12A from the LED drive circuit 26, or in the voltage supply time, where the power supply voltage is supplied to the LED elements 12A from the LED drive circuit 26 (S2).

If determining that the detection timing is in the voltage non-supply time (S2: NO), the MCU 27 detects a voltage level and reads the first threshold Vth1 from the memory 28 and compares the detected voltage level with the first threshold Vth1 (S10). If determining that the detection timing is in the voltage supply time (S2: YES), the MCU 27 detects a voltage level and reads the second threshold Vth2 from the memory 28 and compares the detected voltage level with the second threshold Vth2 (S30). If the MCU 27 determines that the voltage level related to each of the power supply voltages detected in all the voltage supply time and the voltage non-supply time is higher than the first threshold Vth1 or the second threshold Vth2 (S10: YES, S30: YES), the power supply voltages are effectively high. The MCU 27 clears the counter 29 and controls the LED drive circuit 26 to continue supplying the drive voltage and continues monitoring the power source voltage (S17, S37, S1).

Figure 7:
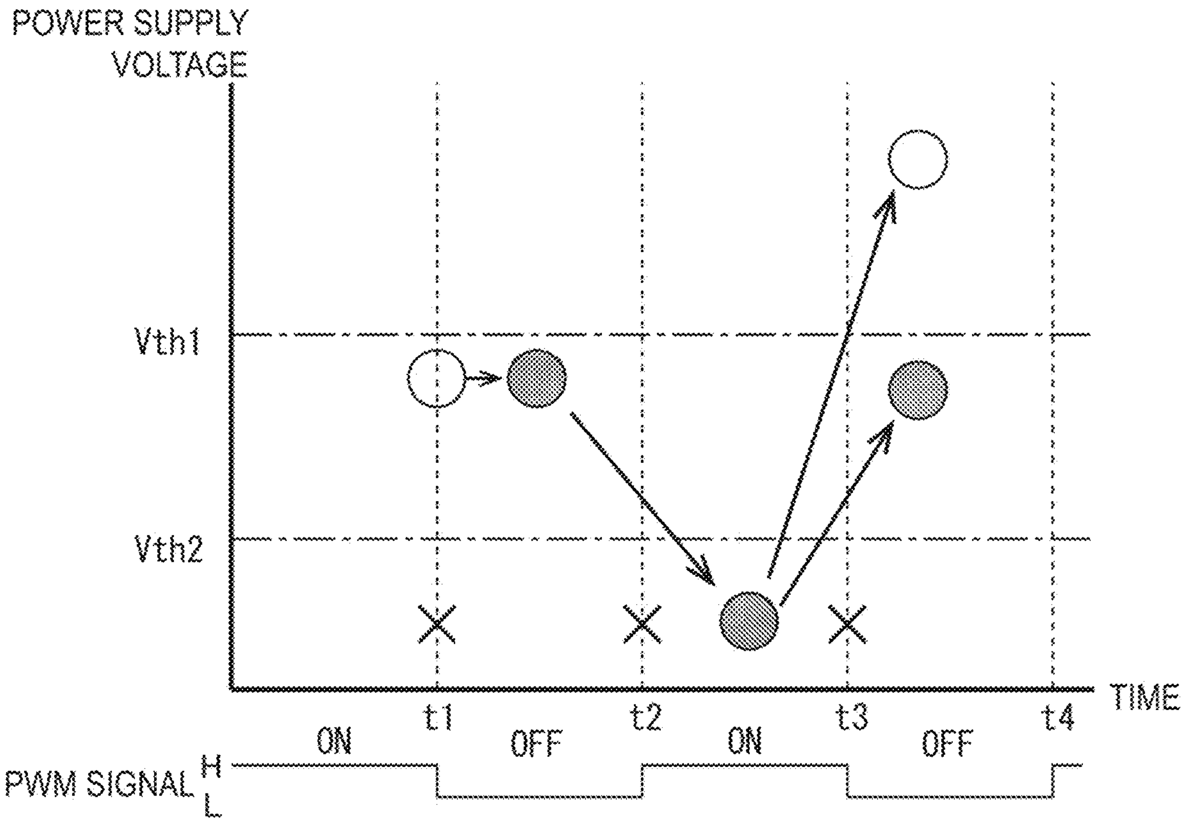
FIG. 7 is a time chart illustrating the same relation as that in FIG. 6 when a power supply voltage lower than the first threshold or the second threshold is continuously detected twice by the MCU.

With reference to FIG. 7, the MCU 27 determines that the voltage level related to the power source voltage detected by the MCU 27 in the voltage supply time (at the time t1) is higher than the second threshold Vth2 (S30: YES) and determines that the voltage level related to the power source voltage detected by the MCU 27 in the subsequent voltage non-supply time (at the time t2) is lower than the first threshold Vth1 (S10: NO). The counter 29 is counted up by 1 and the counter value becomes 1 (S11). The MCU 27 determines that the voltage level related to the power source voltage detected by the MCU 27 in the subsequent voltage supply time (at the time t3) is lower than the second threshold Vth2 (S30: NO). The counter 29 is counted up by 1 and the counter value becomes 2 (S31). Namely, the voltage level related to the power source voltage that is lower than the first threshold Vth1 or the second threshold Vth2 is detected continuously twice and the counter value is 2. With the counter value being 2, it is determined whether the supply of the drive voltage and the monitoring of the power supply voltage are to be performed or not according to the voltage level related to the power supply voltage that is detected by the MCU 27 in the subsequent voltage non-supply time (at the time t4).

If determining that the voltage level related to the power supply voltage detected in the voltage non-supply time is higher than the first threshold Vth1 (S10: YES, ○ in FIG. 7) after two continuous determinations that the voltage level is lower than the first threshold Vth1 or the second threshold Vth2 and the counter value becomes 2, the power supply voltage is at the required level. The MCU 27 clears the counter 29 and continues supplying the drive voltage from the LED drive circuit 26 and continues monitoring the power source voltage (S17, SS1). On the other hand, if determining that the voltage level related to the power supply voltage detected in the voltage non-supply time is lower than the first threshold Vth1 (S10: NO, ● in FIG. 7) after two continuous determinations that the voltage level is lower than the first threshold Vth1 or the second threshold Vth2 and the counter value becomes 2, the counter 29 is counted up by 1 (S11) and the counter value becomes 3. Since the counter value reaches the reference number (S12: YES), the MCU 27 clears the counter 29 and controls the LED drive circuit 26 to stop supplying the drive voltage and stop monitoring the power source voltage (S14). The backlight 12 is turned off. In the monitoring process performed when the PWM control of the LED elements 12A is not performed and the duty ratio of the voltage supply time is always 100%, the MCU 27 makes determination regarding the supply of the drive voltage and the monitoring of the power source voltage with referring to the first threshold Vth1 and the second threshold Vth2 as appropriate in synchronization with the PWM control.

Other Embodiments

The technology described herein is not limited to the embodiments described in this specification and illustrated in the drawings. For example, the following embodiments may be included in the technical scope of the present invention.

(1) The MCU 27 may not collectively control the LED elements 12A of all the groups included in the backlight 12 with the PWM but may control the LED elements 12A in each of the groups with the PWM. In such a control method, the MCU 27 may shift the timing of starting the voltage supply time for each of the groups and this reduces the voltage drop caused by the supply of drive voltage to the LED elements 12A of each group. The MCU 27 can monitor the power source voltage in synchronism with the PWM control of the LED elements 12A and determine the voltage level related to the power source voltage based on different thresholds. This is particularly effective when a resistance value related to circuits of the LED elements 12A is high.

(2) The MCU 27 may not convert the thresholds Vth1 to Vth4 and the voltage level related to the power source voltage into the ADC values but may compare them with analog values. An input power source voltage with respect to the MCU 27 may be set lower than a logic power source voltage of the MCU 27.

(3) The MCU 27 may not have the functions of generating and outputting the PWM signals but a device (the voltage supply control section) having the functions of generating and outputting the PWM signals may be included independently of the MCU 27. The PWM signals may be supplied to the MCU 27 from the signal supply source and the MCU 27 may output the supplied PWM signals to the LED drive circuit 26.

(4) The MCU 27 may not have the function of detecting a voltage level related to the power source voltage but a device (the voltage level detection section) having the function of detecting the voltage level related to the power source voltage may be included independently of the MCU 27. For instance, an external circuit having the function of detecting a voltage level related to the power source voltage may be prepared independently of the MCU 27 and the external circuit may output signals according to the voltage levels related to detected power source voltages and the signals outputted from the external circuit may be input to the MCU 27.

(5) ICs other than the MCU 27 may be used.

(6) In FIGS. 2, 3, 6, and 7, the duty ratio of the voltage supply time and the voltage non-supply time is 50%:50%. However, the duty ratio of the voltage supply time and that of the voltage non-supply time may differ from each other and the specific duty ratio may be altered as appropriate.

(7) The specific reference number of times may be a number other than three.

(8) The period of a cycle at which the voltage supply time and the voltage non-supply time are repeated and the frequency may be altered from 2 ms and 500 Hz, respectively, as appropriate. For instance, the period of a cycle at which the voltage supply time and the voltage non-supply time are repeated may be 2.5 ms and the frequency may be 400 Hz. In such a case, the timing of switching between the voltage supply time and the voltage non-supply time does not necessarily coincide with the detection timing of detecting the voltage level related to the power source voltage; however, this is not a problem.

(9) The periodical cycle at which the MCU 27 detects a voltage level related to the power supply voltage may be altered from 1 ms as appropriate. The periodical cycle at which the MCU 27 detects a voltage level may be changed such that the detection timing of detecting a voltage level coincides with the timing of a high potential PWM signal.

(10) The number of groups of the LED elements 12A may be altered from four. The direct current supplied to each of the groups may be altered from 100 mA as appropriate.

(11) The liquid crystal display device 10 may not include the touch panel 13.

(12) The liquid crystal display device 10 may not be installed in a vehicle but may be used for a monitor or a television device.

(13) A power supply supplying power supply voltage to the liquid crystal display device 10 may not be the battery.

(14) The display device may not be the liquid crystal display device 10 but may be an organic EL display or a microLED display.

(15) The MCU 27 may not include the step-down circuit. In such a configuration, a step-down circuit may be prepared as an external circuit independently of the MCU 27. The step-down circuit reduces a power supply voltage that is input to the LED drive circuit 26 via the interface connector 20 and a monitoring voltage that is generated via the external circuit may be inputted to the ADC circuit of the MCU 27.

(16) The touch panel 13 may be built in the liquid crystal panel 11 (with a in-cell technology). A system driver integrally including the source driver 11A and the timing controller 22 may be used. The gate driver 11B may be monolithically included in a substrate of the liquid crystal panel 11. The source driver 11A including the touch panel controller 23 therein may be used as an integral driver. The MCU 27 may include the memory 28 therein.

The invention claimed is:

1. A voltage monitoring device comprising:

a voltage supply device configured to receive a first voltage from an external device and generate a second voltage for driving an electric component from the first voltage and supply the second voltage to the electric component;

a voltage supply control section configured to control the voltage supply device and control a duty ratio of a voltage supply time in which the second voltage is supplied to the electric component from the voltage supply device and a voltage non-supply time in which the second voltage is not supplied to the electric component from the voltage supply device;

a voltage level detection section configured to detect a voltage level related to the first voltage; and a voltage monitor section configured to compare the voltage level with a first threshold in the voltage non-supply time, compare the voltage level with a second threshold in the voltage supply time, the second threshold being lower than the first threshold, control the voltage supply device to continue supplying the second voltage when the voltage level is higher than the first threshold or the second threshold, and control the voltage supply device to stop supplying the second voltage when the voltage level is lower than the first threshold or the second threshold; wherein the voltage level detection section is further configured to periodically detect the voltage level related to the first voltage, and the voltage monitor section is further configured to control the voltage supply device to stop supplying the second voltage and stop monitoring the first voltage when a number of times the voltage level lower than the first threshold or the second threshold is continuously detected reaches a reference number, and control the voltage supply device to continue or temporally stop supplying the second voltage when the voltage level higher than the first threshold or the second threshold is detected before the number of times the voltage level lower than the first threshold or the second threshold is continuously detected reaches the reference number.

2. The voltage monitoring device according to claim 1, wherein the voltage monitor section is further configured to compare the voltage level related to the first voltage with the first threshold and a third threshold that is higher than the first threshold in the voltage non-supply time, compare the voltage level related to the first voltage with the second threshold and a fourth threshold that is higher than the second threshold and lower than the third threshold in the voltage supply time, control the voltage supply device to continue supplying the second voltage and continue monitoring the first voltage when the voltage level higher than the third threshold or the fourth threshold is detected before the number of times the voltage level lower than the first threshold or the second threshold is continuously detected reaches the reference number, and control the voltage supply device to temporally stop supplying the second voltage and continue monitoring the first voltage when the voltage level higher than the first threshold and lower than the third threshold is detected or the voltage level higher than the second threshold and lower than the fourth threshold is detected before the number of times the voltage level lower than the first threshold or the second threshold is continuously detected reaches the reference number.

3. The voltage monitoring device according to claim 1, wherein a formula of n T2>T1 is established when T1 represents a periodic cycle of repeating the voltage supply time and the voltage non-supply time with the voltage supply control section, T2 represents a periodic cycle of detecting the voltage level with the voltage level detection section, and n represents the reference number of times.

4. The voltage monitoring device according to claim 1, wherein the voltage monitor section has a function of the voltage supply control section.

5. A lighting device comprising:

the voltage monitoring device according to claim 1; and a light source that emits light as the electric component according to supply of the second voltage.

6. A display device comprising:

the lighting device according to claim 5; and a display panel displaying an image using the light from the lighting device.

7. A voltage monitoring device comprising:

a voltage supply device configured to receive a first voltage from an external device and generate a second voltage for driving an electric component from the first voltage and supply the second voltage to the electric component;

a memory storing a first threshold and a second threshold that is lower than the first threshold; and a control device configured to detect a voltage level related to the first voltage and obtain a detected voltage level, determine whether detection timing of detecting the voltage level is in a voltage supply time in which the second voltage is supplied to the electric component from the voltage supply device or in a voltage non-supply time in which the second voltage is not supplied to the electric component from the voltage supply device, compare the detected voltage level with the first threshold when determining that the detection timing is in the voltage non-supply time, control the voltage supply device to continue supplying the second voltage when determining that the detected voltage level is higher than the first threshold, control the voltage supply device to stop supplying the second voltage when determining that the detected voltage level is lower than the first threshold, compare the detected voltage level with the second threshold when determining that the detection timing is in the voltage supply time, control the voltage supply device to continue supplying the second voltage when determining that the detected voltage level is higher than the second threshold, and control the voltage supply device to stop supplying the second voltage when determining that the detected voltage level is lower than the second threshold; wherein the memory further includes a counter counting and storing a number of times the control device continuously determines that the detected voltage level is lower than the first threshold or the second threshold, and the control device is further configured to periodically detect the voltage level related to the first voltage, determine whether the number of times in the counter reaches a reference number, and control the voltage supply device to stop supplying the second voltage and stop monitoring the first voltage when determining that the number of times in the counter reaches the reference number.

8. The voltage monitoring device according to claim 7, wherein the memory further stores a third threshold that is higher than the first threshold and stores a fourth threshold that is higher than the second threshold and lower than the third threshold, the control device is further configured to compare the detected voltage level with the third threshold when determining that the detected voltage level is higher than the first threshold, control the voltage supply device to continue supplying the second voltage and continue monitoring the first voltage when determining that the detected voltage level is higher than the third threshold, control the voltage supply device to temporally stop supplying the second voltage and continue monitoring the first voltage when determining that the detected voltage level is lower than the third threshold, compare the detected voltage level with the fourth threshold when determining that the detected voltage level is higher than the second threshold, control the voltage supply device to continue supplying the second voltage and continue monitoring the first voltage when determining that the detected voltage level is higher than the fourth threshold, and control the voltage supply device to temporally stop supplying the second voltage and continue monitoring the first voltage when determining that the detected voltage level is lower than the fourth threshold.

* * * * *